United States Patent
Hannover et al.

[15] 3,693,687
[45] Sept. 26, 1972

[54] PNEUMATIC VEHICLE TIRE

[72] Inventors: Kurt May Hannover; Gunter Johannes, both of Neustadt/RBGE, Germany

[73] Assignee: Continental Gummi-Werke Aktiengesellschaft, Hannover, Germany

[22] Filed: Oct. 14, 1970

[21] Appl. No.: 80,577

[30] Foreign Application Priority Data

Oct. 25, 1969 Germany.........G 69 41 584.5

[52] U.S. Cl..................................................152/209
[51] Int. Cl..............................................B60c 11/08
[58] Field of Search......................................152/209

[56] References Cited

UNITED STATES PATENTS 3,185,199  5/1965  Klingemann et al.......152/209
1,835,639  12/1931  Dolding....................152/209

FOREIGN PATENTS OR APPLICATIONS 880,418  3/1943  France.......................152/209

Primary Examiner—James B. Marbert
Attorney—Walter Becker

[57] ABSTRACT

A pneumatic vehicle tire with a profiled tread strip in which at least two circumferential ribs are provided with a circumferential groove therebetween while said ribs located on opposite sides of said grooves are respectively provided with protrusions extending from opposite sides into said circumferential groove, each protrusion on one side of one and the same groove being located oppositely one protrusion on the other side of said groove while one of each two protrusions which are located opposite to each other extend into the groove to a different extent.

10 Claims, 3 Drawing Figures

PATENTED SEP 26 1972 3,693,687

INVENTOR
KURT MAY
BY Günter Johannes

PNEUMATIC VEHICLE TIRE

The present invention relates to a pneumatic vehicle tire with a profile tread strip which has two or more circumferential ribs between which straight circumferential grooves are arranged.

It is known to profile the tire strip surfaces in such a manner that noninterrupted circumferential grooves are arranged between the circumferential ribs. Such tread strip configuration has the advantage that the water will be shed at the ground contact area in a satisfactory manner, but tires of this type have only a relatively small grip capacity.

It is, therefore, an object of the present invention to so design the tread strip and its pattern that not only a satisfactory water shed, but also an increased grip capacity will be obtained.

These and other objects and advantages of the invention will appear more clearly from the following specification, in connection with the accompanying drawing, in which.

Figure 1:
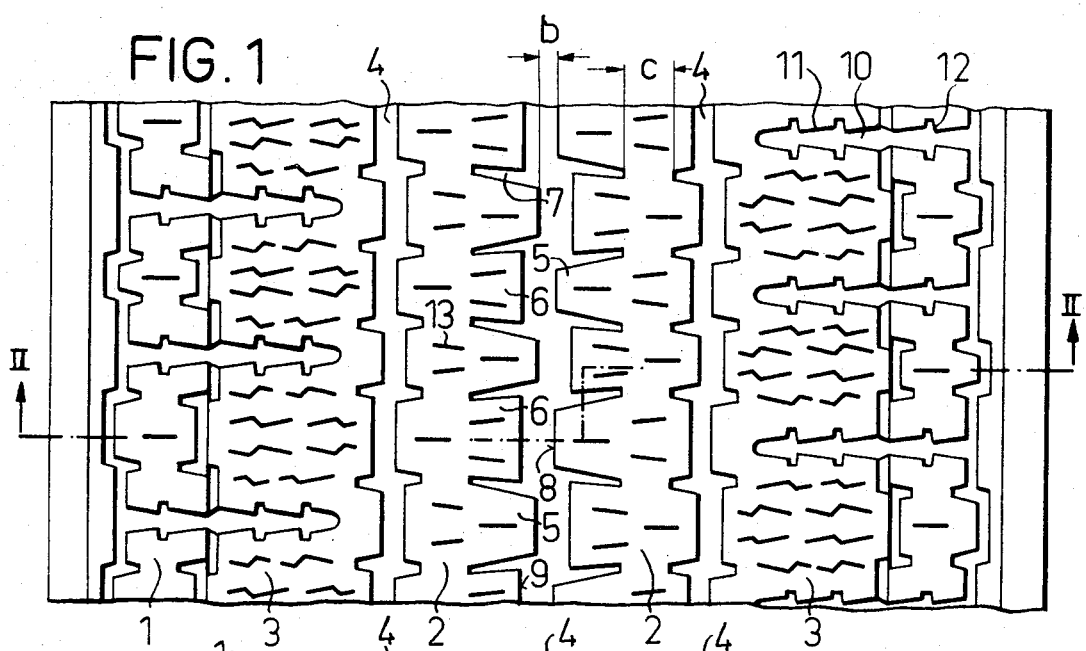
FIG. 1 is a top view of a tread strip according to the invention for a pneumatic tire.
Figure 2:
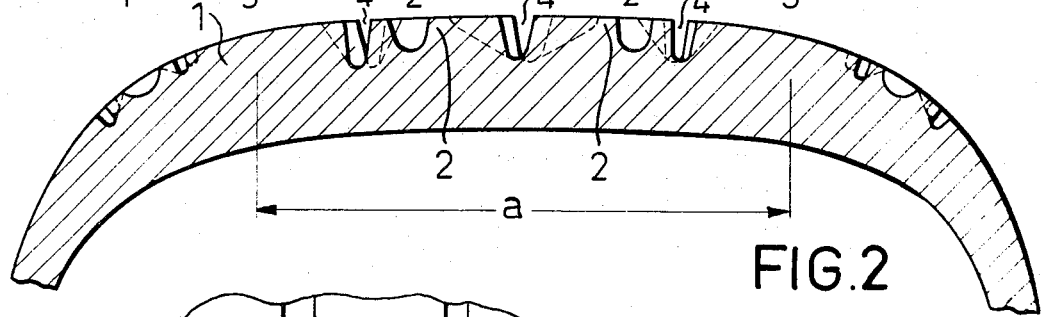
FIG. 2 represents a section through the zenith portion of the tire according to FIG. 1, said section being taken along the line II—II of FIG. 1.
Figure 3:
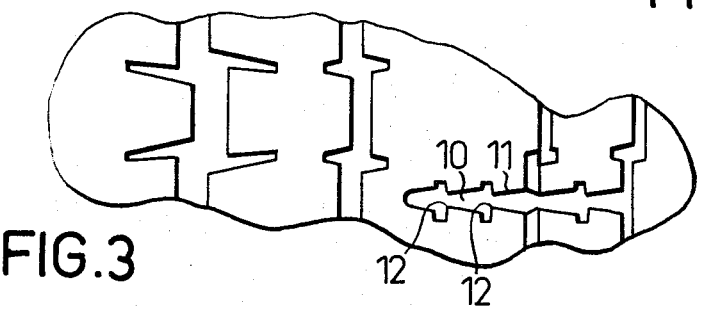
FIG. 3 is a top view of a portion of the tread strip of the tire according to FIG. 1 on an enlarged scale.

The pneumatic vehicle tire according to the present invention with a profiled tread strip having two or more circumferential ribs with straight circumferential grooves therebetween is characterized primarily in that the circumferential grooves are at both sides thereof provided with block-like protrusions while the protrusions of adjacent circumferential ribs are located opposite to each other, and the protrusion of one circumferential rib extends further into the respective circumferential groove than the oppositely located protrusion of the adjacent circumferential rib.

These protrusions arranged on both sides of the circumferential grooves and pertaining to adjacent circumferential ribs bring about an increased grip capacity. However, since the protrusions leave a straight groove therebetween which is uninterrupted in circumferential direction, it will be assured that, for instance, with heavy rain and even at high speeds a satisfactory water shed will be obtained. Therefore, tires according to the present invention are also highly satisfactory for high speeds.

Referring now to the drawing in detail, the tread surface proper of the pneumatic tire extends over the central peripheral portion $a$ of the tire. The marginal areas of the tread surface at both sides of the area $a$ merge with round shoulders 1. Thus, the area or range $a$ is characterized primarily by two circumferential ribs 2 in the central portion of the tread surface, and by circumferential bands or strips 3 located in the marginal regions of the tread surface at both sides of the region $a$.

Between the two circumferential ribs 2 or between one circumferential rib 2 and a circumferential strip or band 3 there are provided circumferential grooves 4 which have a circumferentially uninterrupted straight portion $b$.

The circumferential ribs 2 and also the circumferential bands or strips 3 have protrusions 5, 6 which in plan view have a trapezoidal shape. These protrusions 5 and 6 are such that the protrusions 5 and 6 which are located opposite to each other respectively extend to a different extent into the circumferential grooves 4. More specifically, the protrusion 5 extends further into the circumferential groove 4 than the protrusion 6. Since the protrusions 5 and 6 follow each other in circumferential direction, it will be appreciated that for each circumferential band or strip 3 or each circumferential rib 2 there is obtained a sequence of circumferentially successively following protrusions 5 and 6 which, in their turn, are separated from each other by narrow cuts 7 in such a way that the protrusions which farther extend into the circumferential groove 4 are getting narrower toward the circumferential groove 4 whereas the protrusions 6 which extend to a lesser degree into the circumferential groove 4 become wider toward the circumferential groove 4. Since furthermore when considering a circumferential groove 4, a protrusion 5 is located opposite to a protrusion 6, narrow end faces 8 of the protrusions 5 are adjacent to wider end faces 9 of the protrusions 6.

The cuts 7 are, with each circumferential groove and also with the circumferential bands or strips 3, only so deep that these tread surface portions will have a portion $c$ which is uninterrupted in a circumferential direction.

In view of the uninterrupted portion $b$ in combination with the protrusions 5 and 6 which protrude to a different extent and are separated from each other by cuts 7, a highly satisfactory water shed in the circumferential grooves is obtained, while at the same time, a high grip capability for the profile is secured at the ground contact areas.

The trapezoidal form of the protrusions 5 has been selected while this form is particularly suitable for absorbing high circumferential forces.

The circumferential bands are, within the region of the marginal areas of the tread surfaces and of the shoulders 4, provided with transverse cuts 10 which are defined at both sides by approximately saw-tooth shaped edges 11. These saw-teeth point with their tips 12 toward the center of the tread surface. In this way, also when driving through a curve, a highly satisfactory grip against transverse forces will be assured.

It may also be mentioned that the circumferential ribs 2, as well as the circumferential strips or bands 3, substantially have transversely extending relatively narrow fine cuts 13 which contribute to an increased elastic deformability of these profile elements.

It is, of course, to be understood that the present invention is, by no means, limited to the particular construction and design as shown in the drawing, but also comprises any modifications within the scope of the appended claims.

What we claim is:

1. A pneumatic vehicle tire with a profiled tread strip having at least two circumferential ribs with circumferential groove means therebetween, in which said ribs on both sides of said groove means are respectively provided with oppositely located block-type protrusions extending into said groove means, each protrusion on one side of one and the same groove means being located oppositely one protrusion on the other side of said one and the same groove means so that pairs of protrusions extend from opposite sides into one and the same groove means, one of each two protrusions of each pair of protrusions extending into the respective groove means to a greater extent than the respectively oppositely located protrusion of the same pair of protrusions, that protrusion of each pair of mutually oppositely located protrusions which extends farthest into said groove means having a trapezoidal plan view with the narrower side thereof respectively extending parallel in the circumferential direction of the tire and forming the side farthest extending into the respective groove means.

2. A tire according to claim 1, in which that protrusion of each pair of mutually oppositely located protrusions which extends least into said groove means has a trapezoidal plan view with the longer side thereof extending in the circumferential direction of the tire and forming the side which faces the respective adjacent groove means.

3. A tire according to claim 2, in which the pairs of mutually oppositely located protrusions are arranged one behind the other in the circumferential direction of the tire so that on each side of said groove means the protrusions in the circumferential direction of the tire alternate as to the extent to which they extend into said groove means.

4. A tire according to claim 3, which includes cutouts between successive protrusions in the circumferential direction of the tire.

5. A pneumatic tire according to claim 4, in which the tire at its shoulder areas comprises circumferential bands having edges facing said groove means and being formed in conformity with the circumferential ribs.

6. A tire according to claim 5, in which said circumferential bands are provided with a plurality of grooves extending in a direction transverse to the tire circumferential direction and being spaced from each other, said last mentioned grooves being provided with lateral edges of a saw-tooth contour, so that the saw-teeth point to the central portion of the tread surface.

7. A tire according to claim 6, in which the grooves of said circumferential bands end in spaced relationship to the edges of the circumferential bands laterally confining a circumferential groove.

8. A tire according to claim 5, in which the circumferential bands are provided with protrusions extending in a direction transverse to the circumferential direction of the tire, and that the protrusions of the circumferential ribs in the vicinity thereof when seen in the transverse direction of the tire have a shorter length than the corresponding protrusions adjacent the circumferential groove means in the central portion of said tire.

9. A tire according to claim 8, in which the protrusions laterally of said circumferential groove means and being of different length have a trapezoidal plan view so that the smaller one of the two trapezoidal edges which are parallel to each other face the circumferential groove means.

10. A tire according to claim 6, in which both the circumferential ribs and the circumferential bands have fine cuts extending substantially transverse to the tire circumferential direction.

* * * * *